(No Model.)

G. W. BIERER.
METALLURGICAL FURNACE.

No. 483,985. Patented Oct. 4, 1892.

Witnesses:
Wm. S. Bostwick
Geo. W. Bowers

Inventor.
George W. Bierer
pr Josiah W. Olls
Attorney

UNITED STATES PATENT OFFICE.

GEORGE W. BIERER, OF ALLEGHENY, ASSIGNOR OF ONE-HALF TO GEORGE W. BOWERS, OF PITTSBURG, PENNSYLVANIA.

METALLURGICAL FURNACE.

SPECIFICATION forming part of Letters Patent No. 483,985, dated October 4, 1892.

Application filed July 7, 1892. Serial No. 439,306. (No model.)

*To all whom it may concern:*

Be it known that I, GEORGE W. BIERER, a citizen of the United States, residing at Allegheny, in the county of Allegheny and State of Pennsylvania, have invented a new and useful Improvement in Metallurgical Furnaces, of which the following is a specification.

My invention relates to an improvement in furnaces of that class or character wherein gaseous fuel is used in combination with currents of atmospheric air, both of which enter separately, and are intensely heated on their way into the furnace by passing through masses of openly-arranged brick brought to a high degree of heat by the outgoing flame and escaping products of combustion, and in this respect the furnace is constructed and adapted to operate in a manner similar to a Siemen's regenerative furnace; but instead of fuel produced from coal I propose to use crude petroleum, whereby a more intense heat may be obtained, a better regulation had with less smoke, and an entire absence of outside gas-producers.

My invention consists in such a construction and arrangement of the openly-laid brick in the chamber through which the gas is caused to flow as that a large unobstructed channel shall be formed horizontally through the same, in combination with a tuyere or nozzle at each end thereof, whereby petroleum may be injected in opposite directions into said channel and amid the intensely-heated mass of brick by forcible jets of steam or air and converted into superior gaseous fuel, subject to great nicety of regulation by suitable valves or cocks.

The nature of my invention will be readily understood from the following description, taken in connection with the accompanying drawings, wherein—

Figure 1:
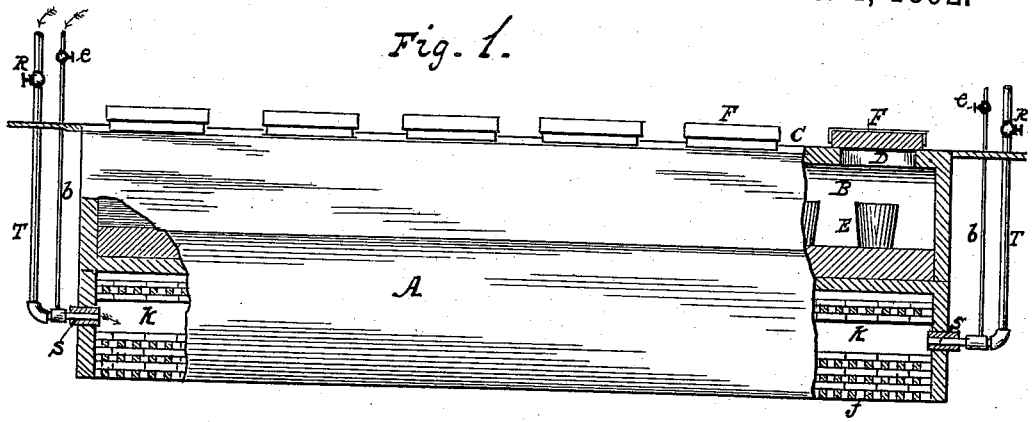
Figure 3:
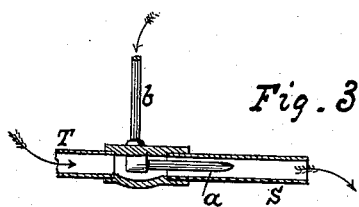
Figure 2:
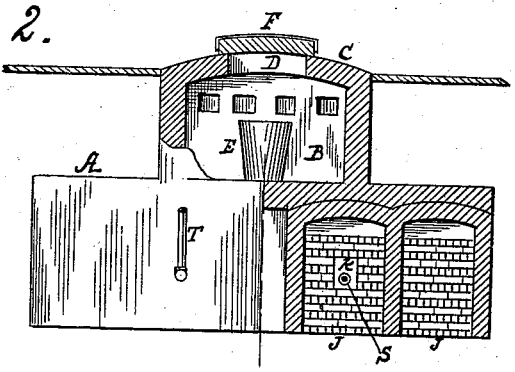

Figure 1 represents a side elevation, partly in section, of a metallurgic furnace provided with my improvement; Fig. 2, a transverse vertical section of the same; Fig. 3, a detached longitudinal section of one of the oil-injectors.

To give my invention bodily form and put the same in practice, I construct a furnace of suitable material, dimensions, and shape required for properly heating, soaking, melting, or otherwise preparing iron or steel for its subsequent conversion into workable or merchantable products. In this present application my invention is shown and described as applied to a crucible steel-melting furnace A, provided with a long combustion-chamber B, having in its top C several openings D, through which the crucibles or pots E may be introduced and withdrawn, and each opening is provided with a detachable lid or cover F after the manner usual in such cases, and in addition thereto it is also provided with gas and air heating devices located below the bottom of the melting-chamber, which devices consist of four separate compartments, each filled with brick J, arranged in open order, so as to leave between them numerous intercommunicating small passage-ways, the outside compartments being those through which air is caused to flow and the inner ones for the gas.

Longitudinally and horizontally within and near the middle of the open brickwork in each gas-compartment is formed a long channel K, extending entirely through the same and in direct communication on all sides with the numerous small passages between its surrounding brick. Through each end wall of the furnace A, opposite and inserted so as to just enter the aforesaid longitudinal channel, is arranged a tuyere S of suitable heat-resisting material, each tuyere being provided with a pipe T, connecting the same to an elevated distant tank containing crude petroleum, which may be permitted to flow through the tuyeres in quantities governed by suitable valves R. Within each tuyere S is arranged a smaller tube *a*, connected by means of a pipe *b* to a steam-generator or device containing air under pressure, by either of which (steam or air) the petroleum will be driven and injected with considerable force into the channel and among the heated mass of open brickwork, the pressure of air or steam acting on the petroleum being regulated by means of a valve *e* in each pipe *b* through which it flows. The petroleum on being injected into the longitudinal channel K by the force of steam or air is by such force sprayed and delivered in a finely-subdivided condition and instantly converted into gas, which ascends through the numerous small spaces between the openly-arranged brick and becomes ignited as it enters the combustion-chamber. Although I have neither shown nor described any device or system of valves for reversing the direction of the gas, air, or flame, such being common to most furnaces supplied with regenerative chambers, I will simply state that such reversing-valves are used in combination with my improvement.

Having thus described my invention, I claim—

In a furnace provided with a combustion-chamber and separate gas-heating and separate air-heating chambers, each gas and air chamber containing an openly-arranged mass of brick, the combination consisting of an unobstructed channel extending longitudinally through the mass of brick in each gas-heating chamber, a tuyere inserted in each end of said channel, a pipe for conducting petroleum into said tuyeres, a pipe for conducting and directing a pressure of steam or air to forcibly inject the petroleum into said channel amid the heated mass of brick, a valve in the petroleum-conducting pipe, and a valve in the injecting-pipe.

GEORGE W. BIERER.

Witnesses:
JOSIAH W. ELLS,
GEORGE W. BOWERS.